United States Patent [19]

Oglesby et al.

[11] Patent Number: 4,706,712
[45] Date of Patent: Nov. 17, 1987

[54] HOSE CONSTRUCTION

[75] Inventors: Donald L. Oglesby; Robert H. Sinnamon, both of Ocala, Fla.

[73] Assignee: Dayco Products, Inc., Dayton, Ohio

[21] Appl. No.: 845,142

[22] Filed: Mar. 27, 1986

[51] Int. Cl.[4] .............................................. F16L 11/08
[52] U.S. Cl. .................................. 138/126; 138/125; 138/127; 138/137
[58] Field of Search ............... 138/121, 122, 132, 129, 138/133, 137, 172, 125, 126, 127

[56] References Cited

U.S. PATENT DOCUMENTS

| | | | |
|---|---|---|---|
| 3,047,026 | 7/1962 | Kahn | 138/137 X |
| 3,416,982 | 2/1968 | Petzetakis | 138/132 |
| 3,447,571 | 6/1969 | Lejeune | 138/138 |
| 3,528,457 | 9/1970 | Martin et al. | 138/132 |
| 3,766,949 | 10/1973 | Champleboux et al. | 138/133 |

FOREIGN PATENT DOCUMENTS

| | | | |
|---|---|---|---|
| 645567 | 11/1950 | United Kingdom . | |
| 991542 | 5/1965 | United Kingdom | 138/132 |
| 1320508 | 6/1973 | United Kingdom . | |

Primary Examiner—James E. Bryant, III
Attorney, Agent, or Firm—Joseph V. Tassone

[57] ABSTRACT

A hose construction and method of making the same are provided, the hose construction having a tubular wall comprising an inner layer of polymeric material, an outer layer of polymeric material, an intermediate layer of polymeric material disposed between the inner and outer layers, a helically wound thermoplastic monofilament of substantially circular transverse cross-sectional configuration embedded in the intermediate layer, a first ply of woven material disposed intermediate the outer layer and the intermediate layer, and a second ply of woven material disposed intermediate the inner layer and the intermediate layer, the monofilament having a diameter that is approximately one-third of the thickness of the wall and is approximately one-third of the distance between the centers of each pair of adjacent turns of the monofilament.

14 Claims, 6 Drawing Figures

HOSE CONSTRUCTION

BACKGROUND OF THE INVENTION

1. Field of the Invention

This invention relates to a new hose construction and to a new method of making a hose construction.

2. Prior Art Statement

It is known to provide a hose construction having a tubular wall means comprising an inner layer means of polymeric material, an outer layer means of polymeric material, an intermediate layer means of polymeric material disposed between the inner and outer layer means, a helically wound thermoplastic monofilament of substantially circular transverse cross-sectional configuration embedded in the intermediate layer means, a first ply of woven material disposed intermediate the outer layer means and the intermediate layer means, and a second ply of woven material disposed intermediate the inner layer means and the intermediate layer means. For example, see British Pat. No. 645,567.

It is also known to provide such a hose construction wherein a helically wound reinforcing wire member is used in place of the helically wound thermoplastic monofilament. For example, see British Pat. No. 1,320,508.

SUMMARY OF THE INVENTION

It is one feature of this invention to provide a hose construction that tends to return to its normal shape even efter the same has been temporarily collapsed, such as by having been run over by a loaded vehicle and/or by being subjected to a high vacuum therein.

In particular, it was well known that a hose construction having a tubular wall means that is reinforced by a helically wound metallic wire member tends to lose its normal shape when subjected to external and/or internal pressure differentials that collapse the hose construction because the wire reinforcing member becomes permanently deformed.

However, it was found according to the teachings of this invention that the use of a helically wound thermoplastic monofilament in place of the wire reinforcing member provides a shape retention characteristic for the resulting hose construction if that thermoplastic monofilament has a substantially circular transverse cross-sectional configuration with a diameter that is approximately one-third of the thickness of the wall means of the hose construction and is approximately one-third of the distance between the centers of each pair of adjacent turns of the monofilament.

For example, one embodiment of this invention provides a hose construction having a tubular wall means comprising an inner layer means of polymeric material, an outer layer means of polymeric material, an intermediate layer means of polymeric material disposed between the inner and outer layer means, a helically wound thermoplastic monofilament of substantially circular transverse cross-sectional configuration embedded in the intermediate layer means, a first ply of woven material disposed intermediate the outer layer means and the intermediate layer means, and a second ply of woven material disposed intermediate the inner layer means and the intermediate layer means, the monofilament having a diameter that is approximately one-third of the thickness of the wall means and is approximately one-third of the distance between the centers of each pair of adjacent turns of the monofilament.

Accordingly, it is an object of this invention to provide a new hose construction having one or more of the novel features of this invention as set forth above or hereinafter shown or described.

Another object of this invention is to provide a new method of making the hose construction, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

Figure 1:
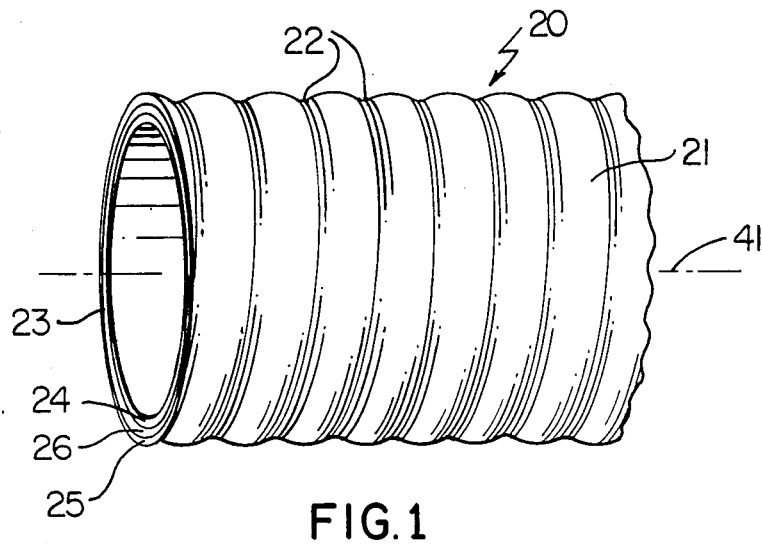
FIG. 1 is a broken-away perspective view of one embodiment of the new hose construction of this invention.

While the various features of this invention are hereinafter illustrated and described as being particularly adapted to provide a hose construction for a tank truck and thereby having particular internal diameters and wall thicknesses, it is to be understood that the various features of this invention can be utilized singly or in various combinations thereof to provide a hose construction with other dimensions and/or for other purposes as desired.

Therefore, this invention is not to be limited to only the embodiments illustrated in the drawings, because the drawings are merely utilized to illustrate one of the wide variety of uses of this invention.

Figure 2:
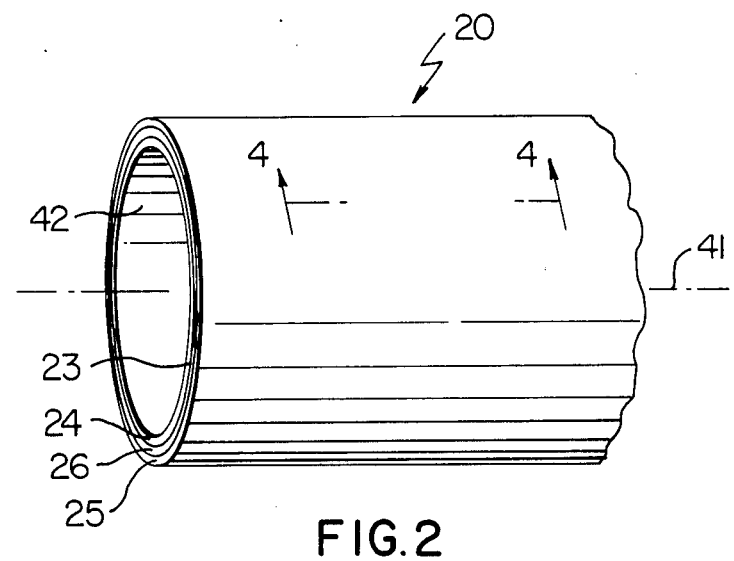
FIG. 2 is a view similar to FIG. 1 and illustrates another embodiment of the new hose construction of this invention.

Referring now to FIGS. 1–4, the new hose construction of this invention is generally indicated by the reference numeral 20 and the only difference between the hose construction 20 of FIG. 1 and the hose construction 20 of FIG. 2 is that the hose construction 20 of FIG. 1 has the outer peripheral surface 21 thereof provided with a plurality of helically disposed convolutions 22 formed therein in a manner well known in the art whereas the outer peripheral surface 21 of the hose construction 20 of FIG. 2 is substantially smooth.

In any event, the hose construction 20 of FIGS. 1 and 2 are identical in the materials used to form the same by the method of this invention and therefore the particular structure of the hose construction 20 of FIG. 2 and the method of making the same will now be described.

Figure 3:
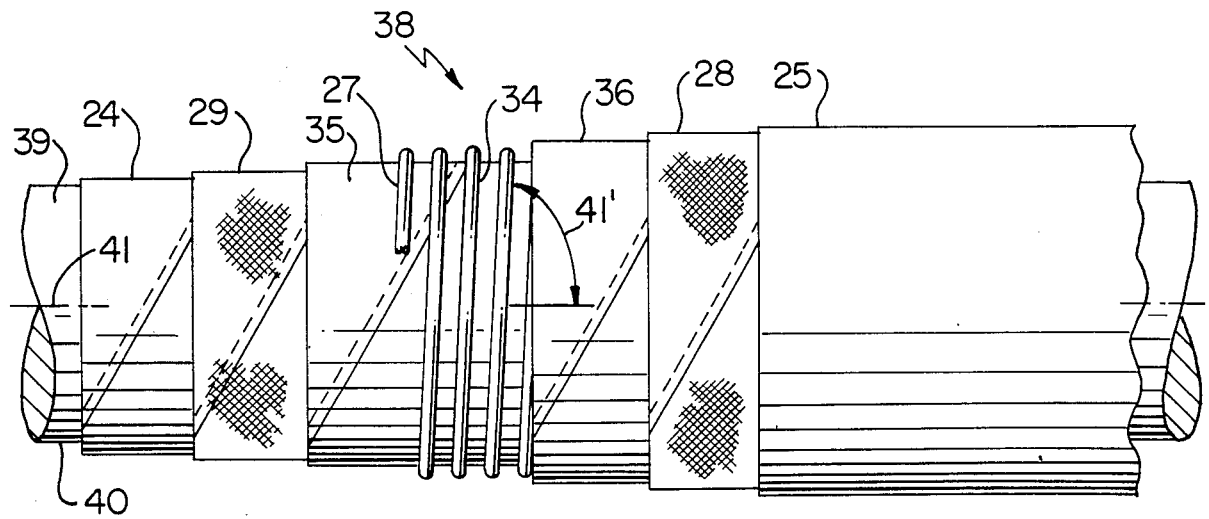
FIG. 3 is a fragmentary view schematically illustrating the method of this invention for forming the hose construction of FIGS. 1 or 2, FIG. 3 illustrating the various layers of the wall means thereof disposed on a forming mandrel in a stepped broken away relation.
Figure 4:
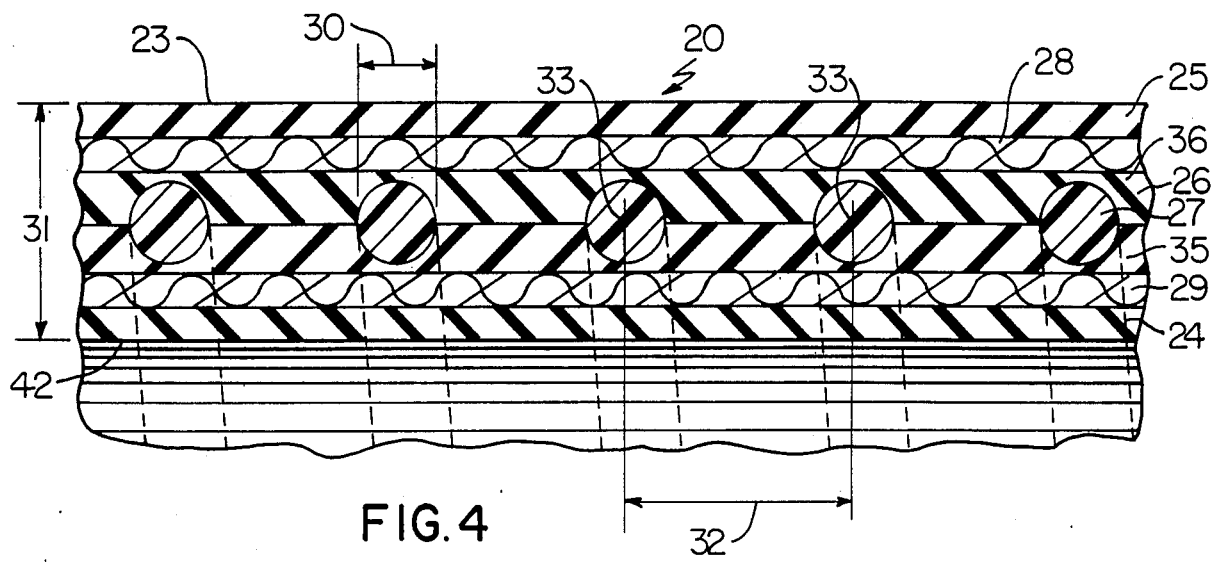
FIG. 4 is an enlarged fragmentary cross-sectional view taken on line 4—4 of FIG. 2.

As illustrated in FIGS. 2–4, the hose construction 20 has a tubular wall means 23 comprising an inner tubular layer means 24 of polymeric material, an outer tubular layer means 25 of polymeric material, an intermediate tubular layer means 26 of polymeric material disposed between the inner and outer layer means 24 and 25, a helically wound thermoplastic monofilament 27 of substantially circular transverse cross-sectional configuration embedded in the intermediate layer means 26, a first tubular ply 28 of woven material disposed intermediate the outer layer means 25 and the intermediate layer means 26, and a second tubular ply 29 of woven material disposed intermediate the inner layer means 24 and the intermediate layer means 26, the layer means 24, 25 and 26 together with the monofilament 27 and plies 28 and 29 having been heat cured together in a manner well known in the art for making hose construction.

As previously stated, such tubular hose construction 20 has a shape retention characteristic and it is believed that such characteristic is provided by the thermoplastic monofilament 27 having a diameter 30, FIG. 4, that is approximately one-third of the thickness 31, FIG. 4, of the wall means 23 and is approximately one-third of the distance 32 between the centers 33 of each pair of adjacent turns 34 of the monofilament 27.

Figure 6:
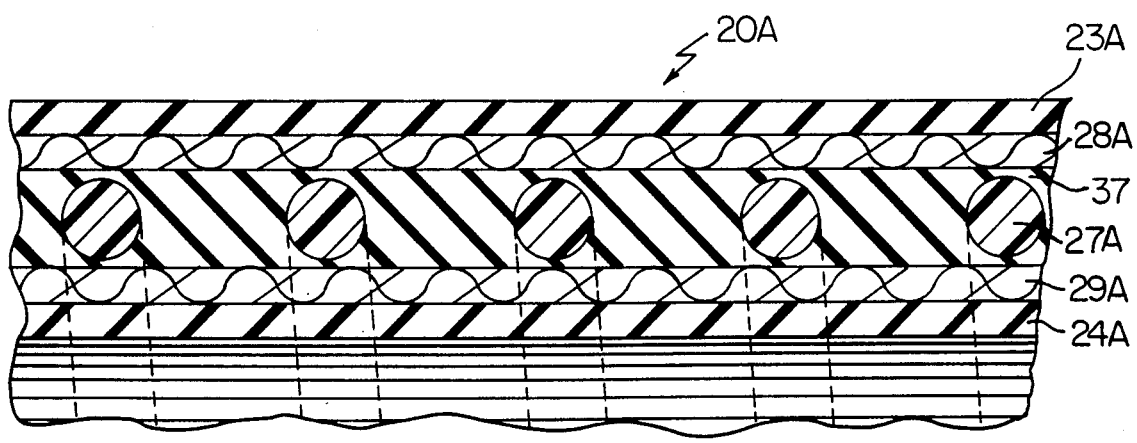
FIG. 6 is a view similar to FIG. 4 and illustrates another embodiment of the hose construction of this invention.

The intermediate layer means 26 of the wall means 23 of the hose construction 20 of this invention is formed from two separate layers 35 and 36 of polymeric material but it is to be understood that the same can comprise a single layer, such as the single layer 37 of the hose construction 20A illustrated in FIG. 6 whereby the various parts of the hose construction 20A of FIG. 6 that are similar to the parts of the hose construction 20 of FIGS. 2–4 are given the same reference numeral followed by the reference letter "A".

One method of this invention for forming the hose construction 20 with the wall means 23 as previously described is generally indicated by the reference numeral 38 in FIG. 3 and comprises a cylindrical mandrel 39 formed of any suitable and conventional material on which the wall means 23 can be formed in a conventional manner such as by wrapping the various layers thereon in the helical overlapping manner as illustrated for the layer means 24, 35 and 36 and for the plies 29 and 28 as illustrated in FIG. 3 or directly in tubular form such as by extrusion for the layer means 24, 35, 36 and 25 as is illustrated in FIG. 3 for the outer layer means 25 and by braiding for the plies 28 and 29.

In any event, the inner layer means 24 of polymeric material is first disposed on the outer peripheral surface 40 of the mandrel 39 and then the ply 29 is disposed on top of the layer means 24. Thereafter, the inner layer means 35 of the intermediate layer means 26 is disposed on top of the ply 29 as illustrated in FIG. 3.

The monofilament 27 is then helically wound on top of the layer means 35 as illustrated in FIG. 3 and in the embodiment of the hose construction 20 of this invention, the turns 34 of the monofilament 27 are helically wound so that not only is the distance between the centers 33 of adjacent turns 34 approximately one-third of the diameter 30 of the monofilament 27 as previously described, but also each turn 34 is disposed at an angle of approximately eighty-seven degrees 41' relative to the longitudinal axis of the hose construction 20 that is represented by the reference numeral 41 in FIGS. 1–3.

Thereafter, the outer layer means 36 of the intermediate layer means 26 is disosed on top of the monofilament 27. The ply 28 is then disposed on top of the layer means 36 and the outer layer means 25 is subsequently disposed on top of the ply 28.

The thus disposed material on the mandrel 39 is subjected to heat and pressure to vulcanize or heat cure all of the polymeric means of the various layers together to form the bonded together hose construction 20 as illustrated in FIG. 2, the basic method of vulcanizing a plurality of layers together to form the wall means of a hose construction being well known in the art and therefore a further description thereof is not necessary.

Should it be desired to form the convolutions 22 in the hose construction 20 as illustrated in FIG. 1, the outer surface of the hose construction has a string (not shown) wound on top of the outer layer means 25 while the hose construction is on the mandrel 39 and before the same has been heat cured whereby the wrapping of the string causes the layer means 25 and 36 as well as the ply 28 to embed between certain turns 34 of the monofilament 27 to a greater extent to form the undulations illustrated in FIG. 1. However, as is well known in the art, normally the undulations 22 do not penetrate to the internal peripheral surface 42 of the hose construction 20 so that the internal peripheral surface 42 remains substantially as a smooth wall as illustrated in the drawings.

Therefore, it can be seen that it is a relatively simple method of this invention to form the hose construction 20 of this invention.

In regards to the method of this invention for forming the hose construction 20A of FIG. 6, it is to be understood that in place of using the layer means 35 on the mandrel 39, the layer means 37 is disposed on the ply 29 and then the monofilament 27 is helically wound on the layer means 37 with the ply 28 then being directly applied on top of the monofilament 27 so that when the resulting wall means 23 is subsequently vulcanized as previously set forth, the monofilament 27 becomes completely embedded in the intermediate layer means 37 as illustrated in FIG. 6 and in a manner well known in the art. For example, see the aforementioned British Pat. Nos. 645,567 and 1,320,508 which are being incorporated into this disclosure by this reference thereto.

One embodiment of this invention that has been successfully used and is produced by the method of this invention comprises a hose construction that is similar to the hose construction 20 of FIGS. 2–4 and has the internal diameter that is defined by the inner peripheral surface 42 thereof of approximately three inches, the thickness 31 of the wall means 23 thereof being approximately 0.484 of an inch and the diameter 30 of the monofilament 27 being approximately five thirtyseconds of an inch with the distance 32 between the center points 33 of the adjacent turns 34 of the monofilament 27 being approximately 0.450 of an inch.

Such a hose construction is made from an inner layer means 24 having a thickness of approximately 0.156 of an inch before the heat curing operation and is formed from a blend of two different polymeric materials, one being NBR and the other being SBR. The ply 29 of woven material comprises a wire braid approximately 0.045 of an inch thick before the heat curing operation and comprised of 0.018 of an inch brassplated steel wire. The inner layer means 35 of the intermediate layer means 26 has a thickness of approximately 0.070 of an inch before the heat curing operation and comprises a blend of two different polymeric materials, one being NBR and the other being SBR with the NBR and SBR thereof being different from the NBR and SBR of the inner layer means 24. The monofilament 27 thereof comprises nylon-6. The outer layer means 36 of the intermediate layer 26 is of the same thickness and of the same material as the inner layer 35 thereof. Similarly, the ply 28 of woven material comprises the same material and thickness as the ply 29. The outer or cover layer means 25 has a thickness of approximately 0.115 of an inch before the heat curing operation and is formed of the same material as the layer means 35 and 36 of the intermediate layer means 26.

Also, a hose construction similar to the above has been made to have an internal diameter of approximately four inches and the same was made of the same layers of material having the aforementioned thickness and materials as the three inch hose construction previously set forth except that the plies 28 and 29 thereof contained more ends of wire braided therein so that the effective thickness of the plies 28 and 29 is greater. Thus, the resulting vulcanized wall means 23 thereof has a thickness 31 of approximately 0.516 of an inch.

However, it is to be understood that the aforementioned dimensions are not to be a limitation on this invention and are merely set forth to illustrate a successfully made embodiment of this invention.

For example, it was found that such a hose construction would tend to return substantially to its original shape even when run over with a pair of tractor/trailer wheels of a loaded vehicle of approximately 60,000 lbs. net weight.

While the hose construction 20 previously set forth has the plies 28 and 29 of woven material comprising braided metallic material, it is to be understood that such plies could be formed of woven textile material and, in particular, braided textile material.

However, it may be found that when braided textile material is utilized for the plies 28 and 29, it may be desirable to use an additional ply of the braided textile material between the inner layer means and the monofilament.

Figure 5:
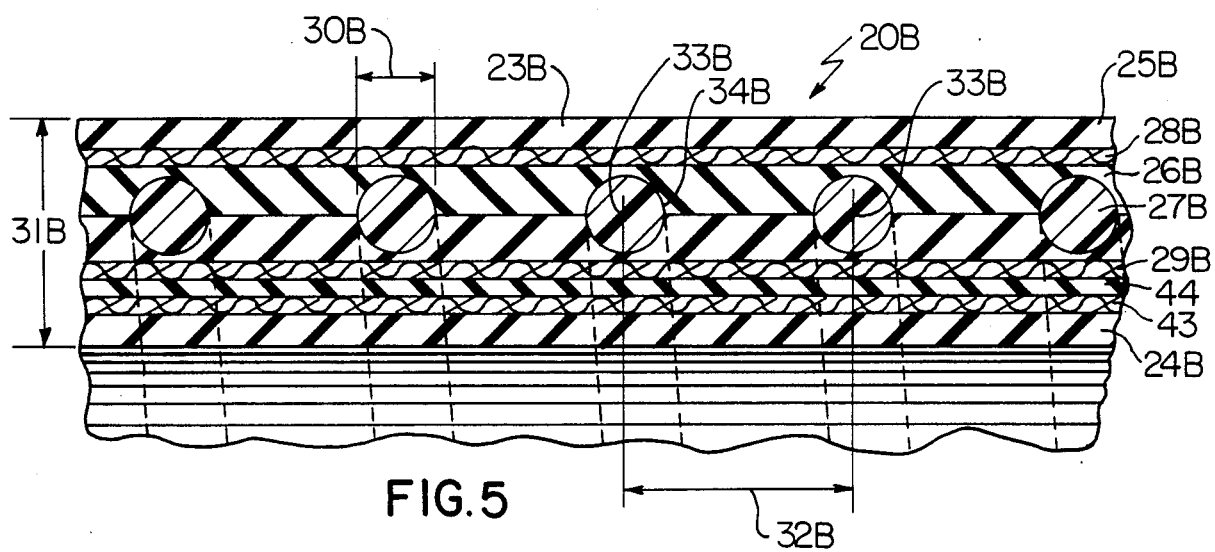
FIG. 5 is a view similar to FIG. 4 and illustrates another embodiment of the hose construction of this invention.

Accordingly, reference is now made to FIG. 5 wherein another embodiment of the hose construction of this invention is generally indicated by the reference numeral 20B and the parts thereof similar to the hose construction 20 previously described are indicated by like reference numerals followed by the reference letter "B".

As illustrated in FIG. 5, the plies 28B and 29B are formed of braided tetile material and an additional ply 43 of braided textile material is disposed intermediate the inner layer means 24B and the ply 29B of braided textile material. In addition, anothr layer means 44 of polymeric material is disposed intermediate the plies 29B and 43, the layer means 44 being formed of the same material as the layer means 25B and 26B.

While the overall thickness 31B of the subsequently heat cured wall means 23B of the hose construction 20B may be greater than the thickness 31 of the hose construction 20 previously described, it can still be seen that the diameter 30B of the monofilament 27B is still approximately one-third of the wall thickness 31B and is approximately one-third of the distance 32B between the centers 33B of adjacent turns 34B of the monofilament 27B for the reasons previously set forth.

Therefore, it can be seen that this invention not only provides a new hose construction, but also this invention provides a new method of making a hose construction.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a hose construction having a tubular wall comprising an inner layer of polymeric material, an outer layer of polymeric material, an intermediate layer of polymeric material disposed between said inner and outer layers, a helically wound thermoplastic monofilament of substantially circular transverse cross-sectional configuration embedded in said intermediate layer, a first ply of woven material disposed intermediate said outer layer and said intermediate layer, and a second ply of woven material disposed intermediate said inner layer and said intermediate layer, the improvement wherein said monofilament has a diameter that has a length that is approximately one-third of the thickness of said wall and that is approximately one-third of the longitudinal cross-sectional distance between the centers of each pair of adjacent turns of said monofilament when considering a longitudinal cross section of said hose construction whereby said hose construction will substantially return to its original shape even after said hose construction has been collapsed by having a vacuum of approximately 24 inches Hg applied therein or by having been run over by a pair of tractor trailer wheels of a loaded vehicle of approximately 60,000 pounds net weight.

2. A hose construction as set forth in claim 1 wherein said turns of said monofilament are each disposed at an angle of approximately eighty-seven degrees relative to the longitudinal axis of said hose construction.

3. A hose construction as set forth in claim 1 wherein each said ply of woven material comprises braided material.

4. A hose construction as set forth in claim 1 wherein each said ply of woven material comprises braided metallic wire material.

5. A hose construction as set forth in claim 1 wherein each said ply of woven material comprises braided textile material.

6. A hose construction as set forth in claim 1 wherein said monofilament has a diameter of approximately five thirty-seconds of an inch.

7. A hose construction as set forth in claim 6 wherein said monofilament comprises nylon.

8. A hose construction as set forth in claim 7 wherein said hose has an inside diameter of between approximately three inches and approximately four inches.

9. A hose construction as set forth in claim 8 wherein each said ply of woven material comprises braided metallic wire material.

10. A hose construction as set forth in claim 8 wherein said outer layer and said intermediate layer comprise the same polymeric material and said inner layer comprises a different polymeric material.

11. A hose construction as set forth in claim 10 wherein said intermediate layer initially comprised two separate layers.

12. A hose construction as set forth in claim 1 wherein said wall further comprises a third ply of woven material disposed intermediate said inner layer and said second ply of woven material.

13. A hose construction as set forth in claim 12 wherein said wall further comprises another layer of polymeric material disposed intermediate said second ply of woven material and said third ply of woven material.

14. A hose construction as set forth in claim 13 wherein each said ply of woven material comprises braided textile material.

* * * * *